(12) United States Patent
Yamanaka et al.

(10) Patent No.: US 6,671,491 B1
(45) Date of Patent: Dec. 30, 2003

(54) SHEET PROCESSOR MOUNTED WITHIN SHEET-DISCHARGE SECTION OF IMAGE FORMING APPARATUS, AND IMAGE FORMING APPARATUS INCLUDING THE SAME

(75) Inventors: Yuji Yamanaka, Ibaraki (JP); Yoshifumi Takehara, Chiba (JP); Daisaku Kamiya, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/610,376

(22) Filed: Jul. 5, 2000

(30) Foreign Application Priority Data

| Jul. 6, 1999 | (JP) | ............................................. 11-192286 |
| Feb. 22, 2000 | (JP) | ....................................... 2000-044916 |

(51) Int. Cl.⁷ ............................................. G03G 15/00
(52) U.S. Cl. ...................................................... 399/407
(58) Field of Search ................................ 399/407, 408, 399/409, 410, 405, 82

(56) References Cited

U.S. PATENT DOCUMENTS

| 4,652,112 A | * | 3/1987 | Randall ........................ 399/402 |
| 4,988,029 A | | 1/1991 | Fiske ............................... 227/5 |
| 5,166,738 A | * | 11/1992 | Tani ............................ 399/402 |
| 5,384,634 A | | 1/1995 | Takehara et al. .............. 355/323 |
| 5,556,251 A | | 9/1996 | Hiroi et al. ................. 414/790.3 |
| 5,573,233 A | | 11/1996 | Hirai et al. ................ 270/58.08 |
| 5,580,039 A | | 12/1996 | Takehara et al. ......... 270/58.11 |
| 5,605,322 A | | 2/1997 | Suzuki et al. ............. 270/58.13 |
| 5,895,036 A | * | 4/1999 | Asao ........................ 270/58.09 |
| 5,897,250 A | | 4/1999 | Hirai et al. .................. 399/404 |
| 5,911,414 A | | 6/1999 | Kato et al. ................. 270/58.07 |
| 5,926,684 A | * | 7/1999 | Horiuchi et al. |
| 6,233,427 B1 | * | 5/2001 | Hirota et al. ................ 399/407 |

FOREIGN PATENT DOCUMENTS

| JP | 05-286281 | * | 11/1993 |
| JP | 5-313428 | | 11/1993 |
| JP | 07-257812 | | 10/1995 |
| JP | 09-175713 | | 7/1997 |
| JP | 10-048901 | | 2/1998 |

* cited by examiner

*Primary Examiner*—Robert Beatty
(74) *Attorney, Agent, or Firm*—Fitzpatrick, Cella, Harper & Scinto

(57) ABSTRACT

A sheet processor including a processing tray for loading thereon sheets transported from a body of an image forming apparatus, an edge aligning unit for aligning edges of the sheets loaded on the processing tray, a batch transporting device for transporting the sheets aligned on the processing tray from the processing tray in a batch, a stack tray for stacking thereon the sheets transported from the batch transporting device, and a driving unit for raising and lowering the stack tray. The sheet processor is mounted within a sheet-discharge section formed in a space in the image forming apparatus. An image reading device is disposed above the sheet-discharge section, and the sheet processor is removably mounted in a space between the reading device and a sheet-discharge tray of the sheet-discharge section.

22 Claims, 11 Drawing Sheets

006,671,491 B1

SHEET PROCESSOR MOUNTED WITHIN SHEET-DISCHARGE SECTION OF IMAGE FORMING APPARATUS, AND IMAGE FORMING APPARATUS INCLUDING THE SAME

BACKGROUND OF THE INVENTION

1. Field of the Invention

The present invention relates to a sheet processor. More particularly, the present invention relates to a reduced in size sheet processor which performs a sheet processing operation, such as a batching operation, an aligning operation or a binding operation (stapling or punching) on sheets that are transported, and which includes a stack section for loading thereon a batch of sheets after the sheet processing operation; and also to an image forming apparatus including the sheet processor.

2. Description of the Related Art

Hitherto, a sheet processor which performs a sheet processing operation (such as an aligning operation or a binding operation on sheets which have been subjected to an image forming operation and transported) and which includes a stack section for loading thereon a stack of processed sheets is disposed adjacent the body of an image forming apparatus. It is well known for the image forming apparatus to use a sorter having a plurality of bins for sorting sheets disposed so as to protrude by a large amount from the body of the image forming apparatus.

However, when the sheet processor is disposed beside the body of the image forming apparatus, the area required to dispose the entire image forming apparatus becomes large. In addition, a support means, such as a caster, for separately supporting the sheet processor, itself, needs to be provided.

When the sorter having a plurality of bins is provided as the sheet processor at the top portion of the body of the image forming apparatus, the height of the entire image forming apparatus becomes large, and a batch of sheets cannot be easily taken out after sheet processing.

SUMMARY OF THE INVENTION

Accordingly, it is an object of the present invention to provide a sheet processor which allows an area required to set an image forming apparatus to be reduced, and an image forming apparatus including the same.

In accordance with one aspect of the present invention, there may be provided a sheet processor comprising:

a processing tray for loading thereon sheets transported from a body of an image forming apparatus;

batch transporting means for transporting the sheets loaded on the processing tray from the processing tray in a batch; and a stack tray for stacking thereon the sheets transported by the batch transporting means;

wherein the sheet processor is mounted within a sheet discharge section formed in a space in an interior section of the image forming apparatus.

The space in the body may be provided in a top portion of the body of the image forming apparatus.

The sheet processor may be removably mounted.

The sheet processor may be mounted to a sheet-discharge tray, with the sheet-discharge tray being integrally formed at the sheet-discharge section.

The entire sheet processor may be accommodated in the sheet discharge section, and may include a stapler or a puncher.

The sheet processor may be such that the edge aligning means aligns the edges of the sheets at a plurality of edge alignment locations, and the batch transporting means comprises the edge aligning means, and a batch transporting belt for transporting the sheets to the stack section in a batch as a result of pushing the batch of sheets aligned on the processing tray by the edge aligning means.

The stack tray may be drawable forwardly of the image forming apparatus, and there may be a guide for guiding the stack tray in a direction in which the stack tray is drawn out.

The stack section may comprise a stack tray for loading thereon the sheets transported by the batch transporting means in a batch, and a stack frame member for supporting the stack tray, in which the stack tray is provided so as to be openable and closable at the stack member.

Sheet guide means for guiding the sheets which are to be transported to the processing tray may be disposed above the processing tray and the stack section.

The sheet processor may further comprise widthwise direction aligning means for aligning the sheets loaded in a batch on the processing tray in a widthwise direction thereof; and driving means for driving the widthwise direction aligning means, the driving means being used to offset the batch of sheets transported by the batch transporting means.

In another aspect of the present invention, there is provided an image forming apparatus comprising: a sheet processor; and a body; wherein the image forming apparatus includes image forming means for forming images on record sheets which are transported, based on image information; and transporting means for transporting to the sheet processor the sheets on which the images have been formed by the image forming means.

The image forming apparatus may further comprise a reading device, disposed above the sheet processor, for reading the image information as a result of scanning an original, and a sheet guide means may be disposed at a lower surface of the reading device.

In yet another aspect of the present invention, there is be provided an image forming apparatus comprising: image forming means for forming images on record sheets which are transported, based on image information; transporting means for transporting the sheets on which the images have been formed by the image forming means; a tray for loading the transported sheets thereon; a reading device, disposed above the tray, for reading the image information as a result of scanning an original; and a sheet processor including: a processing tray for loading thereon the sheets transported from a body of the image forming apparatus; batch transporting means for transporting the sheets loaded on the processing tray from the processing tray in a batch; and a stack tray for stacking thereon the sheets transported by the batch transporting means; wherein the sheet processor is disposed in a space between the tray and the reading device of the image forming apparatus.

The image forming apparatus may be such that the edge aligning means aligns the edges of the sheets at a plurality of edge alignment locations; and the batch transporting means comprises the edge aligning means, and a batch transporting belt for transporting the sheets to the stack tray in a batch as a result of pushing the batch of sheets aligned on the processing tray by the edge aligning means.

The stack tray may be drawable forwardly of the image forming apparatus, and have a guide for guiding the stack section in a direction in which the stack tray is drawn out may be provided at the stack tray and the body of the image forming apparatus.

In accordance with yet another aspect of the present invention, there is provided a sheet processor comprising: a processing tray for loading thereon sheets which are transported; batch transporting means for transporting the sheets on the processing tray from the processing tray in a batch; and a stack tray for stacking thereon the sheets transported from the batch transporting means, wherein the sheet processor is disposed in a space between a sheet-discharge tray of the image forming apparatus and a scanner disposed above the sheet-discharge tray.

Edge aligning means for aligning edges of the sheets loaded on the processing tray, and processing means such as a stapler for processing the batch of sheets aligned on the processing tray may be further provided.

The sheet processor may be such that the edge aligning means aligns the edges of the sheets at a plurality of edge alignment locations, and the batch transporting means comprises the edge aligning means, and a batch transporting belt for transporting the sheets to the stack section in a batch as a result of pushing the batch of sheets aligned on the processing tray by the edge aligning means.

In accordance with still yet another embodiment, there is be provided an image forming apparatus comprising: image forming means for forming images on record sheets which are transported, based on image information; transporting means for transporting the sheets on which the images have been formed by the image forming means; a tray for loading the transported sheets thereon; and a reading device, disposed above the tray, for reading the image information as a result of scanning an original; wherein a sheet processor for binding and loading the sheets transported from a body of the image forming apparatus is removably disposed in a space between the reading device and the tray of the body of the image forming apparatus.

By virtue of the above-described constructions, the batch of sheets transported from the body of the apparatus is subjected to a sheet processing operation, such as an aligning operation or a binding operation, at the processing tray, and, then, transported to the stack tray by the batch transporting means. The sheet processor is disposed at the sheet-discharge section in the body of the apparatus, so that the area required to set the whole apparatus can be reduced.

The edge aligning means used to align the back edges of the sheets of the sheet batch on the processing tray can be set at a plurality of locations, so that a sheet batch location can be selected. Therefore, the sheet batch location may be a binding-operation location which allows a binding operation to be performed by the binding means, or a non-sort location in which the sheet batch is not offset and sorted. For example, when the sheet processor is to process small sheets, such as A4-size sheets, and is in a nonstaple/nonsort mode, a batch of small sheets is loaded and aligned at the nonsort location, making it possible to reduce the amount of time required to transport the batch. On the other hand, when the sheet processor is to process large sheets, such as A3-size sheets, and is in the nonstaple/nonsort mode, a batch of large sheets is loaded and aligned at the nonsort location, so that the front edges of the batch of large sheets will not protrude from the body of the apparatus.

The stack tray for stacking a batch of sheets thereon can be drawn out, so that the stacked batch of sheets becomes easier to take out.

DESCRIPTION OF THE PREFERRED EMBODIMENT

A description of preferred embodiments of the present invention will be given with reference to the drawings.

Figure 1:
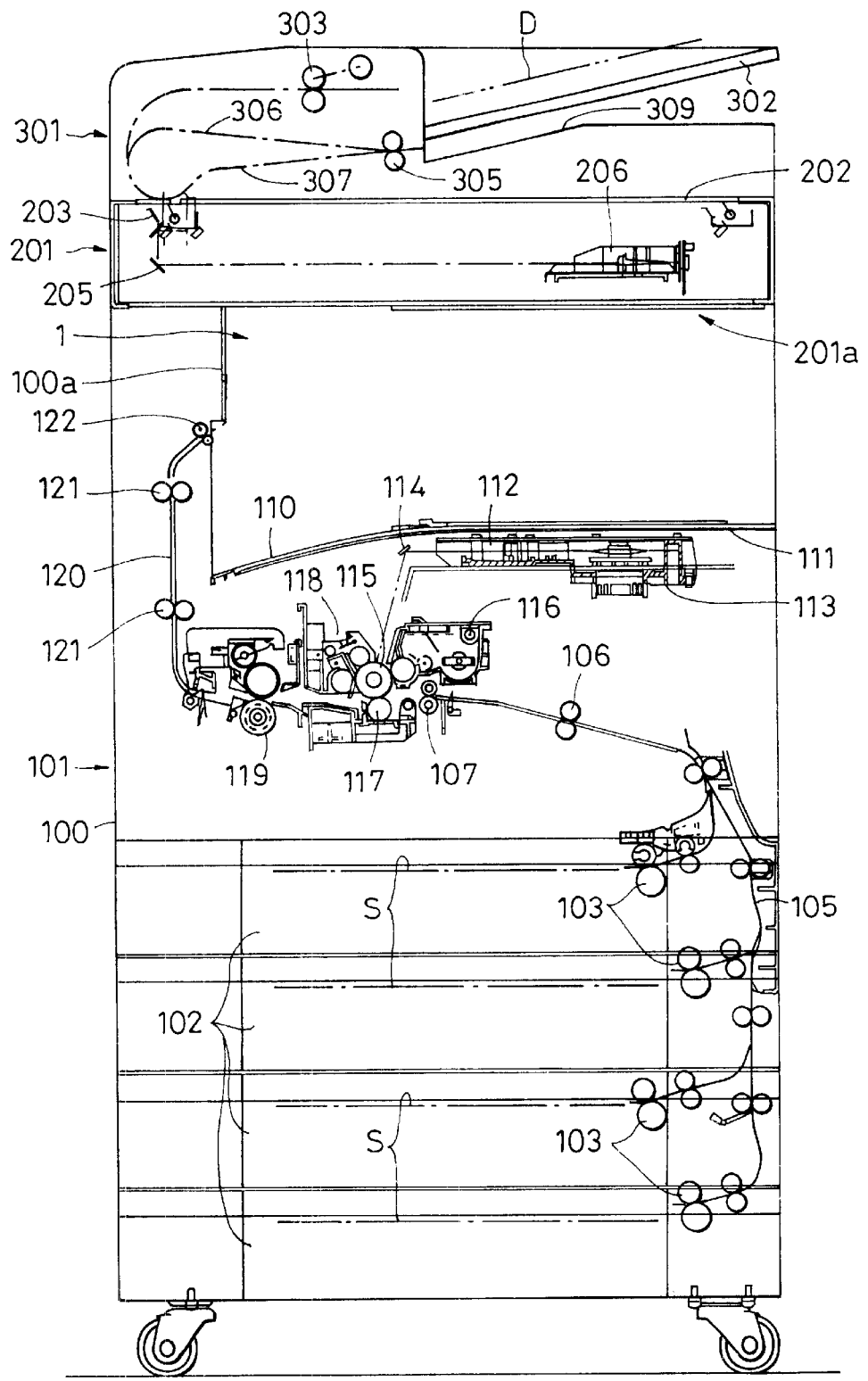
FIG. 1 is a vertical sectional front view of an embodiment of the sheet processor and the image forming apparatus including the same in accordance with the present invention.
Figure 2:
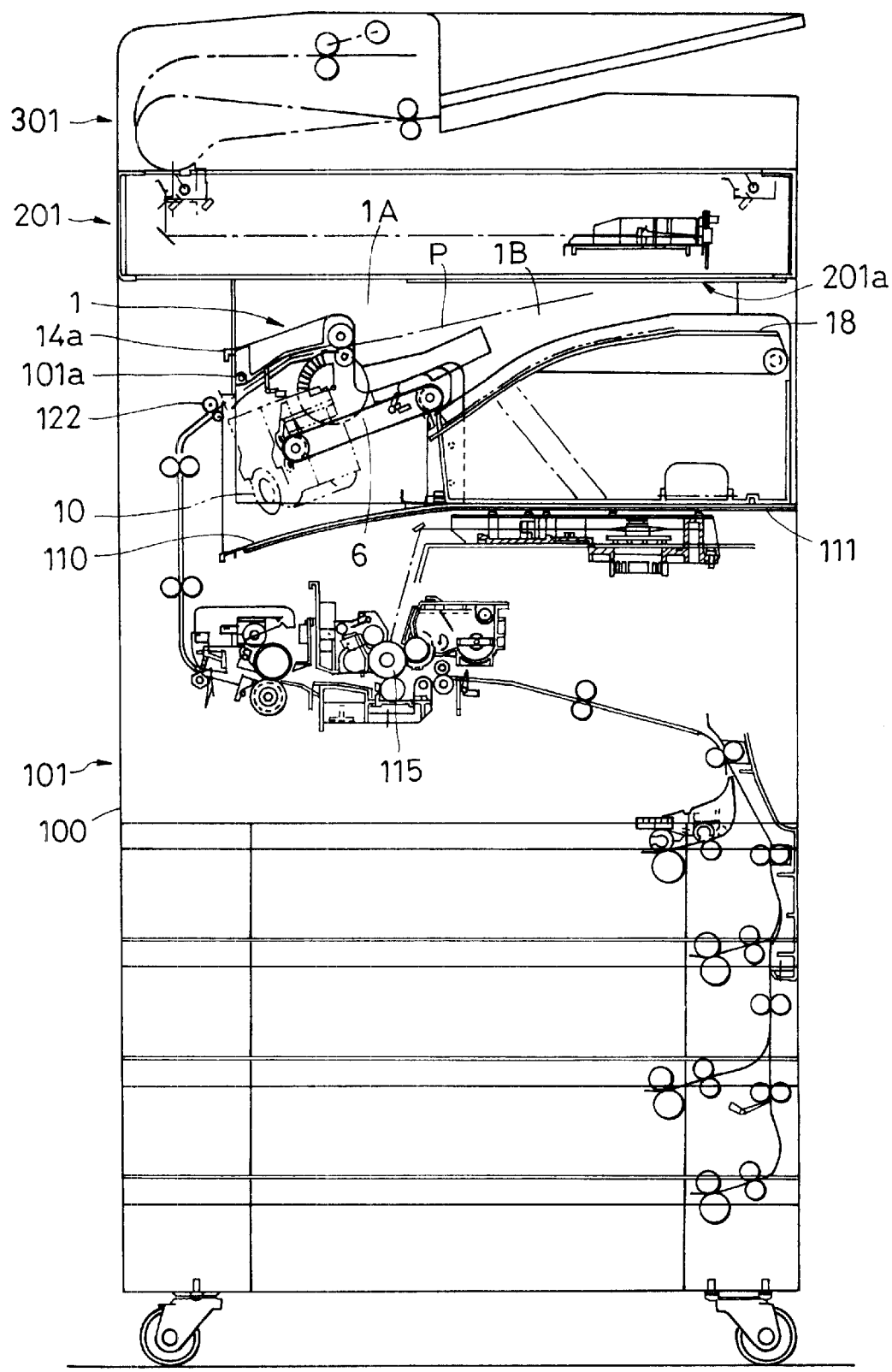
FIG. 2 is a vertical sectional view showing the arrangement of a sheet processing section and a stack section of the sheet processor.

Referring to FIGS. 1 and 2. reference numeral 100 denotes a body of an image forming section; reference numeral 101 denotes a laser beam printer serving as the image forming section; reference numeral 201 denotes a scanner (that is, a reading device) for reading image information of an original placed on a platen 202; reference numeral 301 denotes an automatic original transporting device for transporting originals D to the platen 202 starting with a leading page; and reference numeral 1 denotes a sheet processor of the present invention. The sheet processor 1 is disposed at the top portion of the image forming section, that is, at the top portion of the body 100. Reference numeral 110 denotes a top plate 110 of the body 100.

The automatic original transporting device 301 includes an original tray 302 on which the originals D are placed; an original transporting roller 303 for transporting the originals D starting with a leading page; an original discharge roller 305, and an original discharge tray 309. Reference numerals 306 and 307 denote original discharge paths. The originals D whose images have been read at the platen 202 are transported into the sheet-discharge path 306. Then, they are transported into the original discharge path 307 after a switch-back operation in order to be discharged face down to the original discharge tray 309 starting with a leading page.

The scanner 201 includes the platen 202 formed of glass for placing thereon the originals D transported by the automatic original transporting device 301, a lamp unit 203 including a mirror and an illumination lamp used for scanning the images of the originals D on the platen 202 as a result of reciprocating towards the left and right in FIGS. 1 and 2, a plurality of reflective mirrors 205 for reflecting light reflected off the originals D, and an image processing section 206 for processing the image information of the originals D.

The laser beam printer 101 includes a plurality of cassettes 102 in the lower portion of the body 100 for accommodating record sheets P of different sizes. The plurality of cassettes 102 can be freely drawn out forwardly of the image forming apparatus. Forwardly of the image forming apparatus refers to the front side of the FIGS. 1 and 2. Reference numeral 103 denotes pairs of sheet-feed rollers for feeding sheets P from the plurality of cassettes 102, reference numeral 105 denotes a sheet P transportation path used for transporting fed sheets P, reference numeral 106 denotes a pair of transportation rollers for transporting the sheets P in the transportation path 105, and reference numeral 107 denotes a pair of register rollers used for providing timing to correct an oblique movement of the sheets P and to carry out sheet feeding.

A laser scanner unit is disposed at the top portion in the body 100. The laser scanner unit includes a laser scanner 112 for performing irradiation with laser beams based on image information, and a polygon mirror 113 for projecting the laser beams onto a photosensitive drum (that is, an image forming means) 115 through a reflective mirror 114. A developing device 116, a transfer roller 117, and a cleaner 118 are disposed around the photosensitive drum 115. The developing device 116 is used to develop an electrostatic latent image on the photosensitive drum 115. The transfer roller 117 is used to transfer a toner image onto each of the sheets P. The cleaner 118 is used to clean off any toner remaining on the photosensitive drum 115. Reference numeral 119 denotes a fixing device for fixing the toner image transferred onto each of the sheets P.

Reference numeral 120 denotes a sheet transportation path for transporting upward the sheets P that have been subjected to fixation by the fixing device 119, reference numeral 121 denotes pairs of transportation rollers disposed in the sheet transportation path 120, and reference numeral 122 denotes a pair of discharge rollers for discharging the sheets P transported in the sheet transportation path 120 to the top plate 110. A guide member 201a is integrally formed with the bottom surface of the scanner 201 in order to guide an edge of each of the sheets P transported into the sheet processor 1. The guide member 201a is formed of, for example, a plurality of beads (protrusions and recesses) formed along a transportation direction of the sheets P in order to prevent the sheets P from being attracted to the bottom portion of the scanner 201 as a result of, for example, static electricity.

An image signal from outside the image forming apparatus or an image signal from the image processing section 206 of the scanner 201 is input to the laser scanner 112. The image processing section 206 of the scanner 201 can transmit the image signal processed after reading of the originals D to an external device, as well as to the laser scanner 112.

As described above, when the scanner 201 and the automatic original transporting device 301 are mounted to the laser beam printer 101, a copying machine is formed. When the scanner 201 and the automatic original transporting device 301 are removed from the copying machine, a printer is formed.

A description of the sheet processor 1 (which can be made optionally mountable to and removable from the printer 101) for processing the sheets P discharged from the laser beam printer 101 is given in more detail below with reference to FIGS. 2 to 5.

Figure 9:
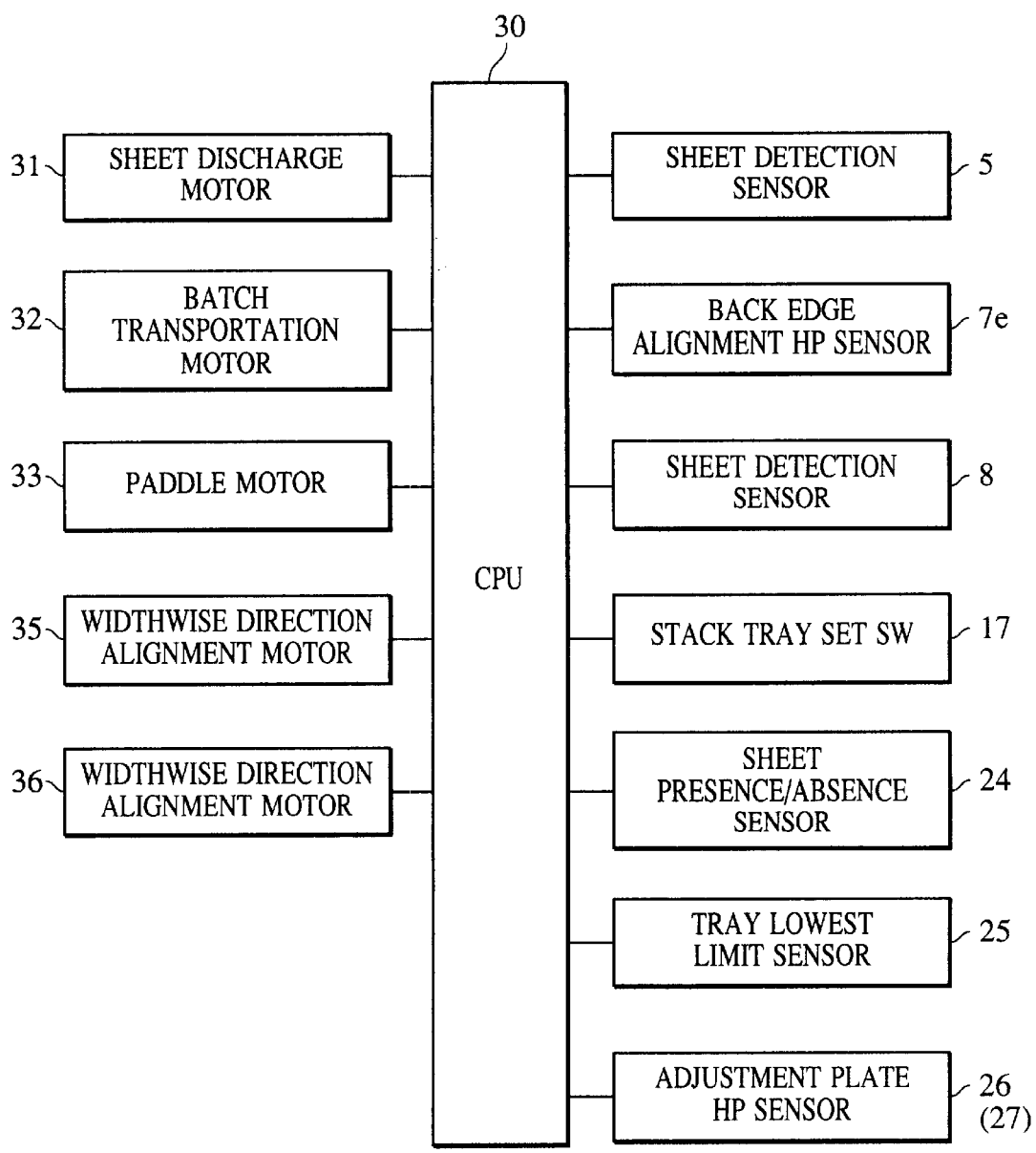
FIG. 9 is a block diagram illustrating a controlling operation of the sheet processor.

As shown in FIG. 2, the sheet processor 1 includes a sheet processing section 1A for performing, for example, a sheet aligning operation or a binding operation (such as stapling or punching), and a stack section 1B which engages the sheet processing section 1A for stacking a batch of sheets that have been subjected to sheet processing. The sheet processor 1 is shown in detail in FIG. 3. FIG. 9 is a block diagram illustrating a controlling operation of the sheet processor 1.

A plurality of motors and a plurality of sensors, used in the sheet processor 1, are connected to a CPU 30 (controlling means).

Figure 3:
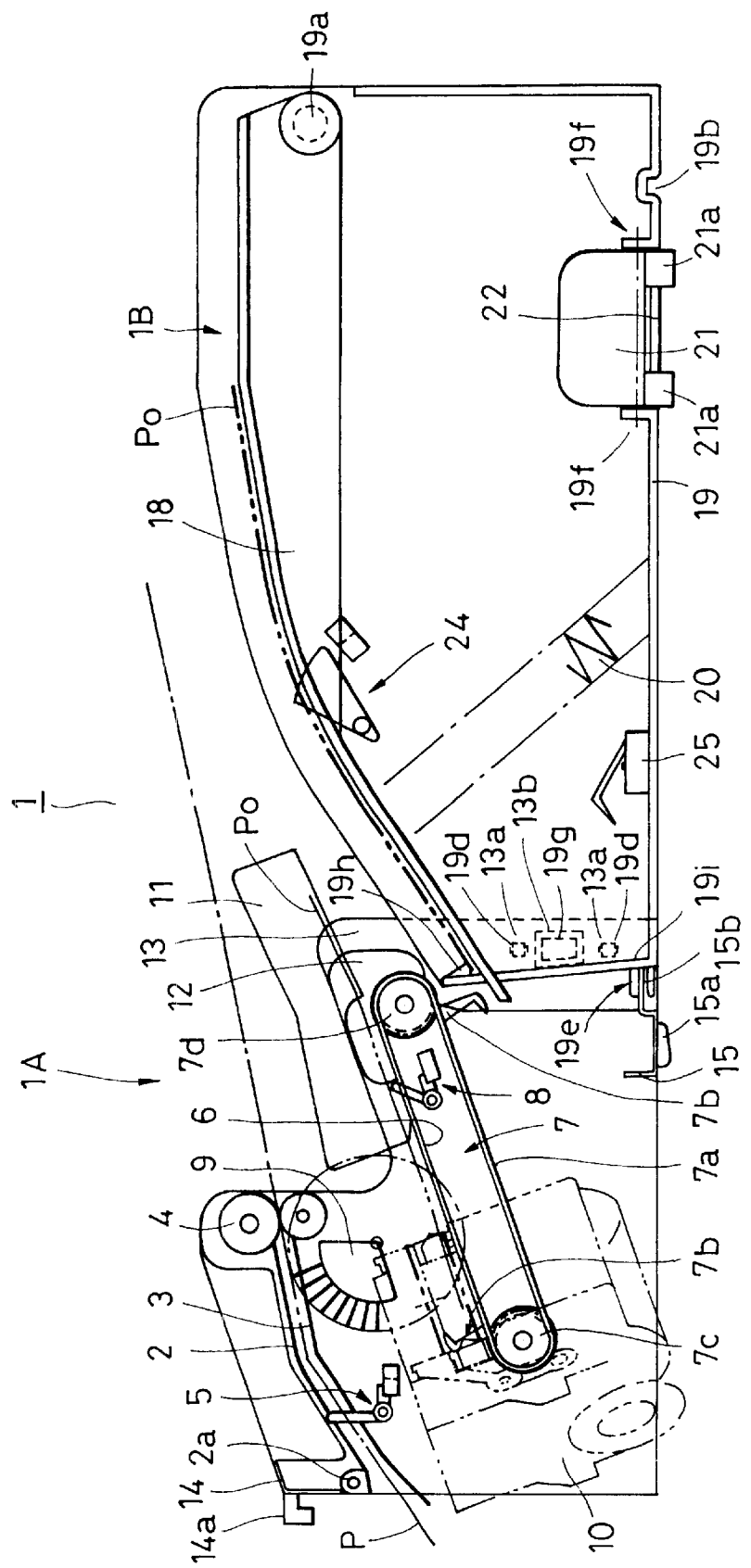
FIG. 3 is a vertical front sectional view showing the sheet processor in detail.

In FIG. 3, an upper transportation guide 2 and a lower transportation guide 3 for transporting the sheets P discharged from the discharge roller 122 of the laser beam printer 101 are disposed in the sheet processing section 1A, with a pair of sheet discharge rollers 4 disposed at downstream side ends of the upper and lower transportation guides 2 and 3. The pair of sheet discharge rollers 4 are driven by a sheet discharge motor 31 (see FIG. 9). The upper transportation guide 2 can be freely opened and closed, with a supporting shaft 2a as a center. The upper roller of the pair of sheet discharge rollers 4 rotates along with the upper transportation guide 2 so that any jammed sheets P can be removed.

Reference numeral 5 denotes a sheet detection sensor for detecting any sheet P in a sheet transportation path formed by the transportation guides 2 and 3. Detection of any jamming of the sheets P, the timing of accelerating and decelerating the sheet-discharge motor 31, the timing of aligning the batch of sheets carried out during a post-processing operation, the timing of stapling the batch of sheets, the timing of transporting the batch of sheets, etc., are based on the sheet detection sensor.

Figure 4:
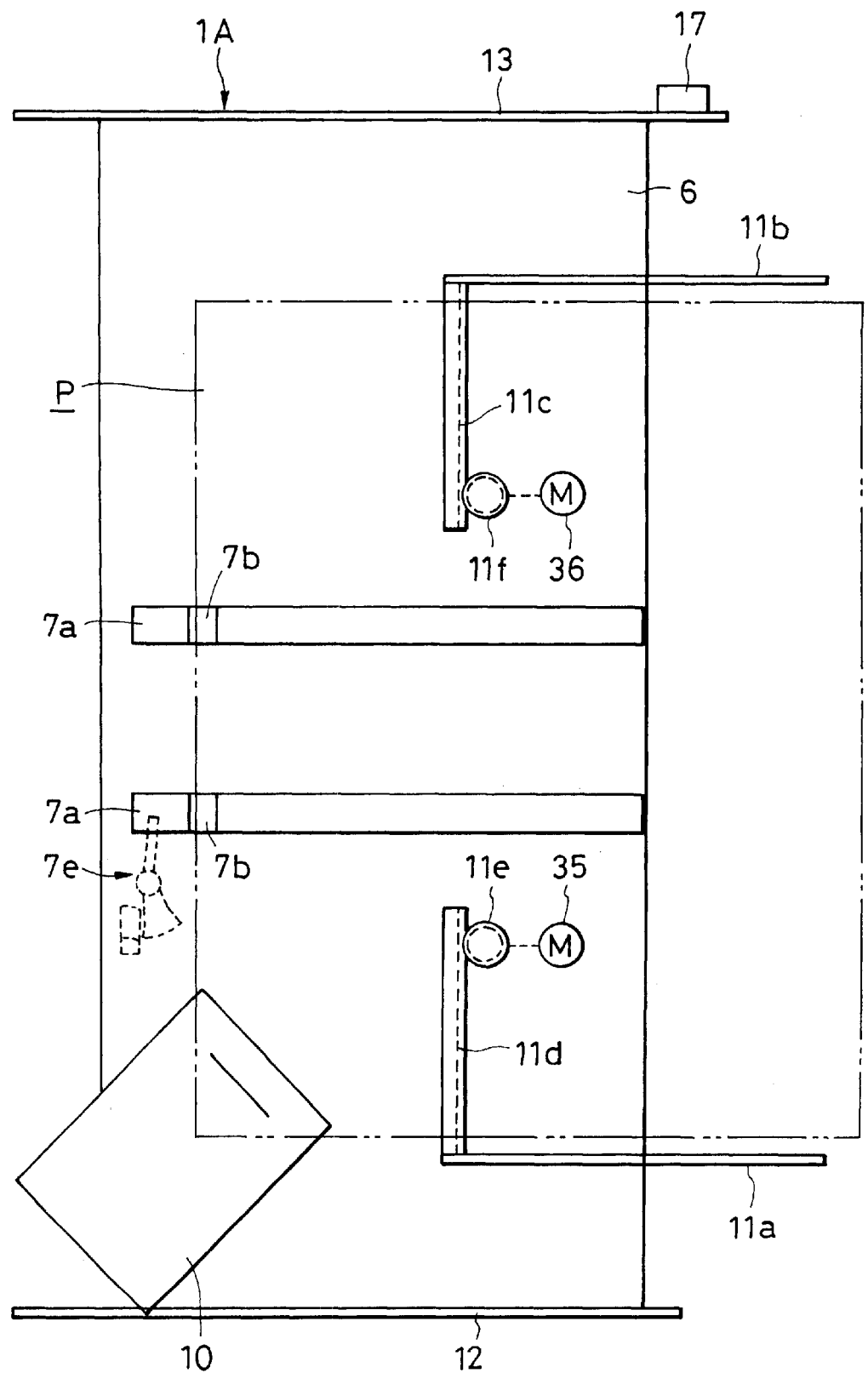
FIG. 4 is a plan view of a processing tray.

In FIGS. 3 and 4, reference numeral 6 denotes a processing tray used for aligning and loading thereon the sheets P discharged from the pair of sheet-discharge rollers 4, reference numeral 7a denotes a batch transporting belt wound around a driving pulley 7c and a driven pulley 7d in order to transport the batch of aligned and loaded or stapled sheets on the processing tray 6 to a downstream-side stack tray 18. The top portion side of the batch transporting belt 7a is disposed at substantially the same height as a sheet-loading plane of the processing tray 6, and can rotate clockwise in FIG. 3 by the batch transportation motor 32 used to drive the driving pulley 7c. As shown in FIG. 4, a pair of such batch transportation belts 7a are disposed on both sides of the center of the processing tray 6 in a widthwise direction thereof. A groove is formed in the processing tray 6 to allow the batch transportation belts 7a to be disposed thereat.

Reference numerals 7b denote edge reference members (edge aligning means) for regulating and aligning the back edges of the sheets P (that is, edges of the returning sheets P subjected to a switch-back operation) loaded on the processing tray 6. The two edge reference members 7b are symmetrically disposed at locations of the respective batch transportation belts 7a. They help the batch transportation belts 7a transport the batch of sheets by pushing the back edges of the batch of sheets when the batch of sheets are to be transported to the stack tray 18 after sheet processing. The batch transportation belts 7a, and the edge reference members 7b, serve as batch transportation means for transporting the batch of sheets.

Reference numeral 8 denotes a sheet presence/absence detection sensor disposed at the processing tray 6. It is used to detect any jamming of the sheets P, to judge whether or not to perform a next job, etc. Reference numeral 9 denotes a paddle, formed of a plurality of resilient members, for sweeping the sheets P to the edge reference members 7b. By rotating the paddle 9 clockwise in FIG. 3, the back edges of the sheets P to be discharged to the processing tray 6 abut against the edge reference members 7b and are aligned. The paddle 9 is driven by a paddle motor 33 shown in FIG. 9.

Reference numeral 10 denotes a stapler unit for driving a needle into the batch of sheets aligned on the processing tray 6 from the bottom side to the top side. By disposing the stapler unit 10 at the bottom left side of the sheet processor 1 and at the front side of the plane of FIG. 4, the upper left corners of the batch of sheets can be stapled. Although, in the embodiment, the stapler unit 10 is used as the sheet-processing means, a puncher for punching holes in the batch of sheets may also be used as the sheet-processing means.

The edge reference members 7b can be set at a plurality of alignment locations, so that it can set at a first alignment location which allows a sheet batch $P_o$ to be stapled by the stapler unit 10, or, when the sheet batch $P_o$ is not stapled, at a second alignment location situated towards the stack tray 18 and away from the first alignment location by a predetermined distance.

Reference numeral 11 denotes an aligning means for regulating and aligning in a widthwise direction the sheets P discharged from the processing tray 6. As shown in FIG. 4, the aligning means 11 includes an aligning plate 11a which reciprocates towards the front side of the sheet processing section 1A, and a reference alignment plate 11b serving as a reference at the back side of the sheet processing section 1A. A pinion 11e engages a rack 11d formed integrally with the alignment plate 11a, whereas a pinion 11f engages a rack 11c formed integrally with the reference alignment plate 11b. The pinions 11e and 11f are separately drivable by respective widthwise direction alignment motors 35 and 36 (see FIG. 9).

When the sheet batch $P_o$ on the processing tray 6 is not bound, so that only the back edges are aligned by the edge reference members 7b in order to transport the batch $P_o$, the reference location of the back reference alignment plate 11b can be alternately offset in a widthwise direction in accordance with sheet batches. Accordingly, the sheet batches which are to be transported to the stack tray 18 are sorted by the aligning means 11 in a widthwise direction thereof.

In FIG. 4, reference numeral 12 denotes a front side plate, and reference numeral 13 denotes a back side plate. As shown in FIG. 3, a top stay 14 and a bottom stay 15 are secured, respectively, at the top left portion and the bottom right portion between the side plates 12 and 13. A latching section 14a is formed in the top stay 14 to hook the sheet processor 1 into a hole 101a formed in the laser beam printer 101, while a pair of legs 15a are formed at the bottom stay 15. A guide 15b is formed at the stack section 1B side of the bottom stay 15. The legs 15a are placed on the top plate 110 serving as a tray.

A square hole 13b and a pair of positioning holes 13a for positioning the stack section 1B described later are formed in the back side plate 13. A stack tray set switch 17 (see FIG. 4) for detecting that the stack section 1B has been set at the sheet processing section 1A is disposed in correspondence with a location where the square hole 13b is formed, at the outside surface of the back side plate 13. When the stack tray set switch 17 detects that the stack section 1B has been set at the sheet processing section 1A, it judges that the sheet batch $P_o$ can be transported from the sheet processing section 1A to the stack section 1B.

A description of the stack section 1B will now be given.

Figure 5:
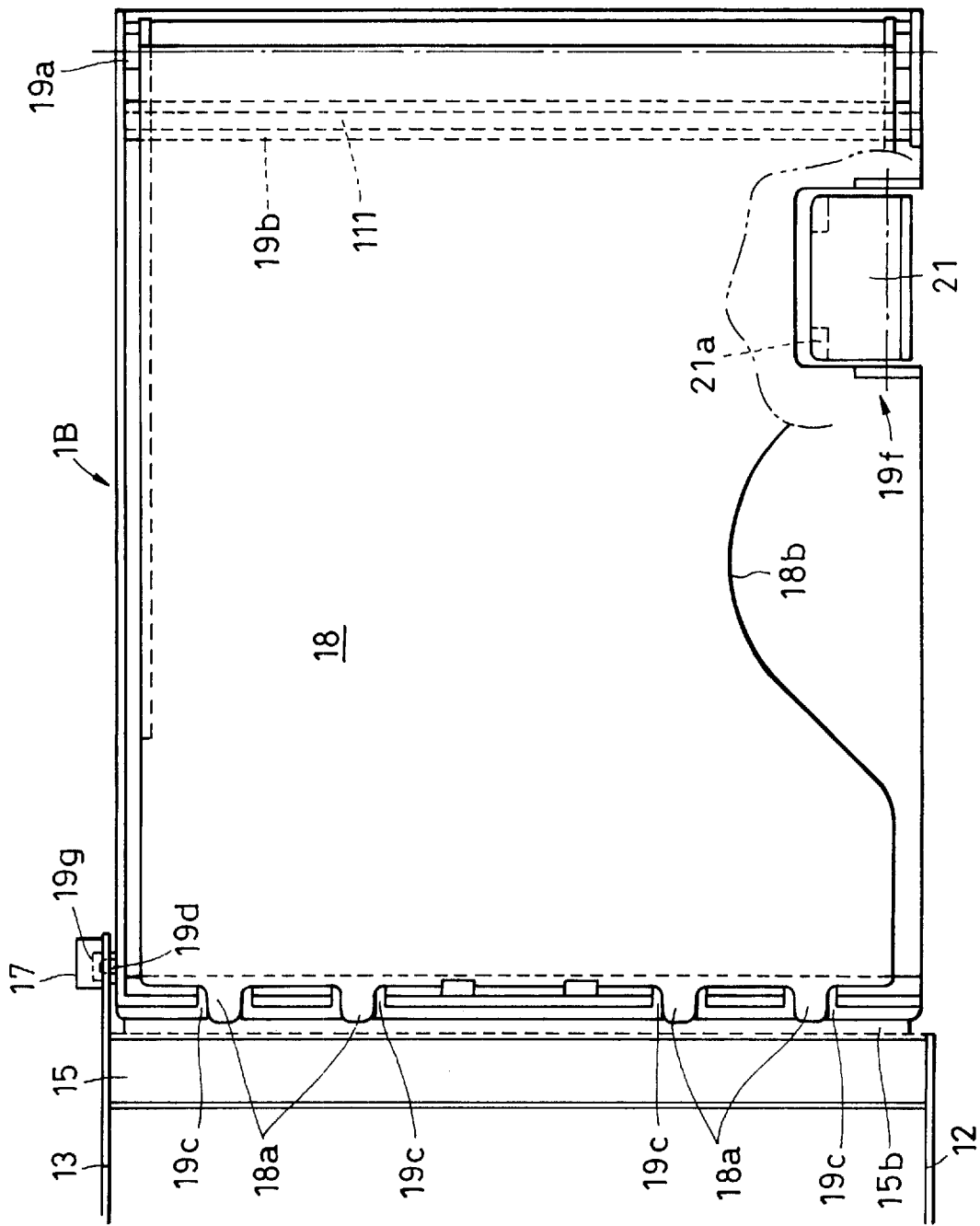
FIG. 5 is a plan view of the stack section.

Referring to FIGS. 3 and 5, the stack section 1B includes the stack tray 18 for stacking thereon the sheet batch $P_o$ that has been transported, and a frame member 19 for supporting the stack tray 18. The stack tray 18 is rotatably disposed at an end of the frame member 19 opposite the sheet processing section 1A, and is made rotatable by a supporting shaft 19a.

A plurality of protrusions 18a are provided at a free end of the stack tray 18. A plurality of rack-like sections 19c are formed in a left side plate 19i (at the sheet processing section 1A side) of the frame member 19 so as to be disposed in correspondence with the protrusions 18a. The rack-like sections 19c are formed by cutting away shapes of racks from a plurality of portions of the side plate 19i. The protrusions 18a of the stack tray 18 are guided so as to be movable vertically. A recess 18b is formed in the front side of the stack tray 18 to make it easier to take out the sheet batch $P_o$ loaded on the stack tray 18.

A guide groove 19e which can slide as a result of engaging the guide 15b of the sheet processing section 1A is formed in the side plate 19i. A guide groove 19b which can slide as a result of engaging a guide rail 111 provided at the top portion of the laser beam printer 101 is provided at the bottom portion of the frame member 19. The guide groove 19e, the side plate 19i, the guide groove 19b, and the guide rail 111, serve as guide means which allows the stack section 1B to be drawn out forwardly of the sheet processor 1.

A protrusion 19d and a set sensor flag 19g are provided at the back side plate of the frame member 19. The protrusion 19d used for positioning can engage the positioning holes 13a formed in the sheet processing section 1A. The set sensor flag 19g is used to operate the stack tray set switch 17 when the stack section 1B has been set at a predetermined location in the image forming apparatus.

A compression spring 20 which biases the stack tray 18 upward is provided in the frame member 19. A stopper 19h is provided at the top portion of the side plate 19i of the frame member 19. It engages either the free end of the stack tray 18 biased upward or the sheet batch $P_o$ loaded on the stack tray 18 in order to keep the sheet batch $P_o$ loading plane at a fixed level. The stopper 19h can be moved to a location which allows the stack tray 18 to be regulated and to a location which allows the stack tray 18 to be freed.

In FIG. 3, reference numeral 24 denotes a sheet presence/absence detection sensor for detecting the presence or absence of a sheet batch $P_o$ on the stack tray 18. When a sheet batch $P_o$ exists, the sheet presence/absence detection sensor 24 detects the presence thereof so that a new job is not accepted. A tray lowest limit sensor 25 is provided in the bottom portion of the frame member 19. When the stack tray 18 moves to its lowest position as a result of having loaded a sheet batch $P_o$ onto the stack tray 18, the tray lowest limit sensor 25 detects that the stack tray 18 is filled in order to stop the loading of the sheet batch $P_o$ onto the stack tray 18 and to indicate to the user through an indicator (not shown) that the sheet batch $P_o$ loaded on the stack tray 18 is to be taken out.

Reference numeral 21 denotes a handle used to draw out the stack section 1B. The handle 21 is rotatably supported by a pair of supporting portions 19f of the frame member 19, and is made rotatable by the supporting shaft 22. The handle 21 engages a latch receiver section 21a provided at the top portion of the laser beam printer 101 in order to keep the stack section 1B at a sheet batch stack location.

A description of the operation of the sheet processor 1 will now be given with reference to FIGS. 6 to 8.

Figure 6:
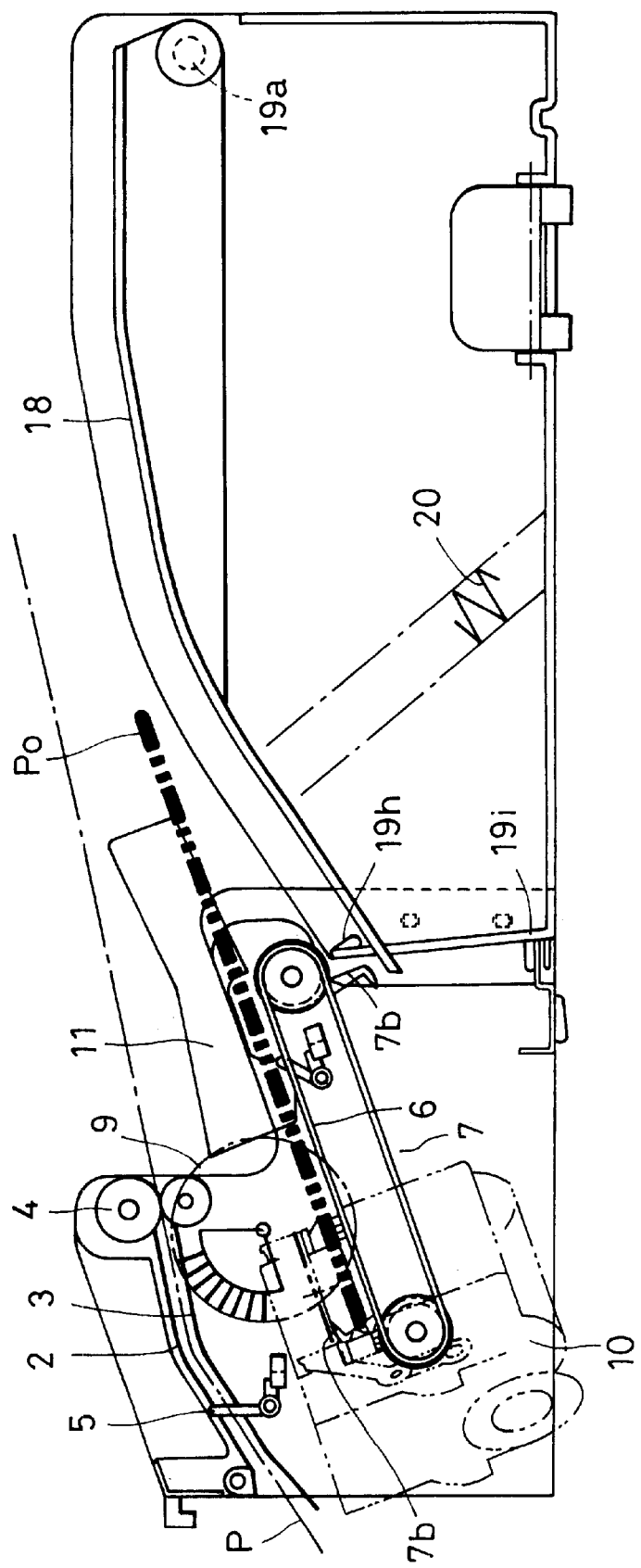
FIG. 6 is a sectional view illustrating the operation of the sheet processor.
Figure 7:
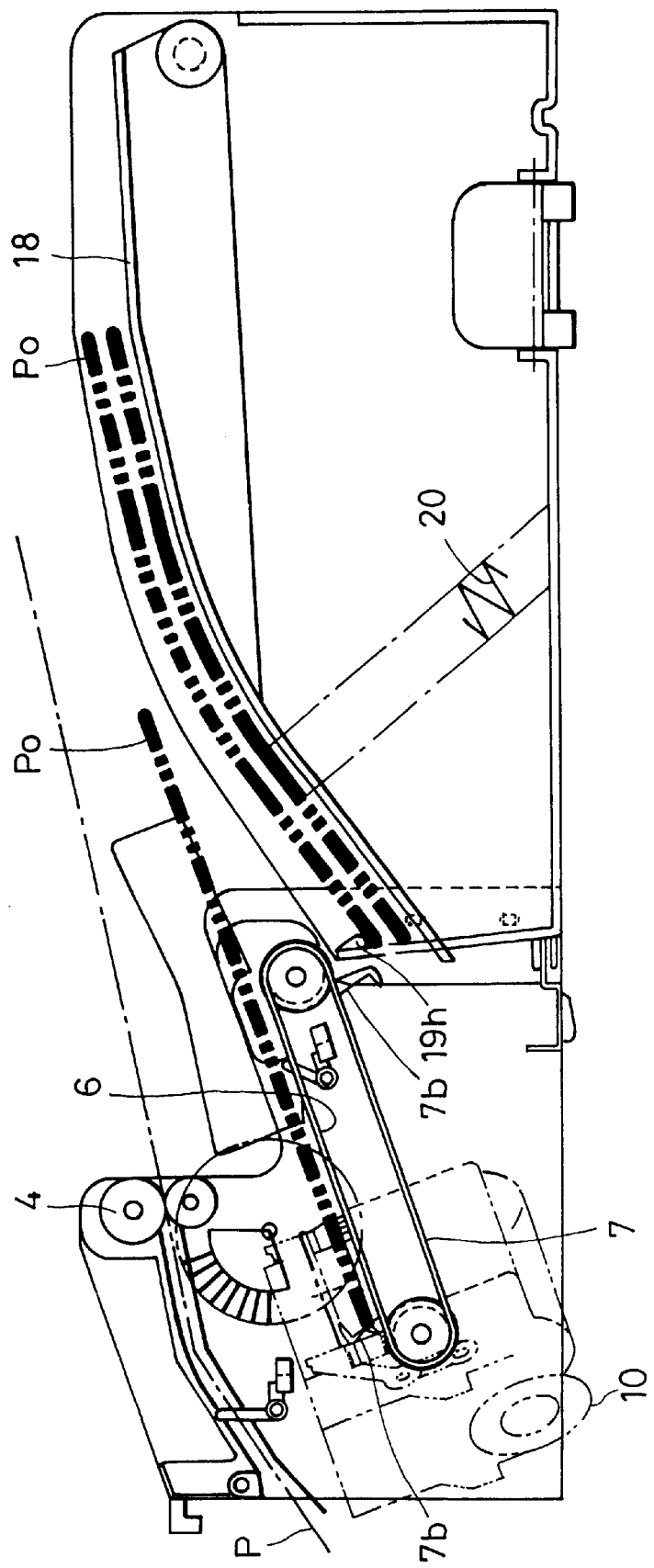
FIG. 7 is a sectional view illustrating the operation of the sheet processor.

FIGS. 6 and 7 illustrate the processing of small sheets P, such as B5-size sheets and A4-size sheets. A sheet P discharged from the laser beam printer 101 passes between the transportation guides 2 and 3, and is detected by the sheet detection sensor 5. Then, it is discharged from the processing tray 6 by the pair of sheet-discharge rollers 4. At the moment the back edge of the sheet P passes by the sheet detection sensor 5, the aligning mechanism 11 begins to align the discharged sheet P in a widthwise direction of the sheet P.

The paddle 9 rotates at a fixed speed at all times in order to sweep the sheets P on the processing tray 6 towards the left side (that is, towards the end reference members 7b) in FIG. 6. The sheets P which are successively transported starting from a leading page are discharged face down to the processing tray 6, and, then, aligned and loaded at the processing tray 6. When an instruction is given to perform a stapling operation on the sheets of a sheet batch $P_o$, corners of the back edges of the sheets of the sheet batch $P_o$ are punched with a needle from below by the stapler unit 10.

The batch transporting belts 7a are driven by the batch transportation motor 32 in order to transport the sheet batch $P_o$ to the stack tray 18. Here, the edge reference members 7b which have aligned the back edges of the sheets of the sheet batch $P_o$ rotate clockwise with the batch transporting belts 7a to push out the sheet batch $P_o$ onto the stack tray 18 and, then, to push the sheet batch $P_o$ downward. The stack tray 18 rotates, with the supporting shaft 19a as a center, as a result of being pushed downward by the edge reference members 7b through the sheet batch $P_o$. When the end reference members 7b pass by the sheet batch $P_o$, they are pushed upward by the compression spring 20. When, as shown in FIG. 7, the top surfaces of the back edges of the sheets of the sheet batch $P_o$ engage the stopper 19h and stop, the stack height of the sheet batch $P_o$ (that is, the height of the sheet batch $P_o$ loading plane) is kept at a fixed level.

Figure 8:
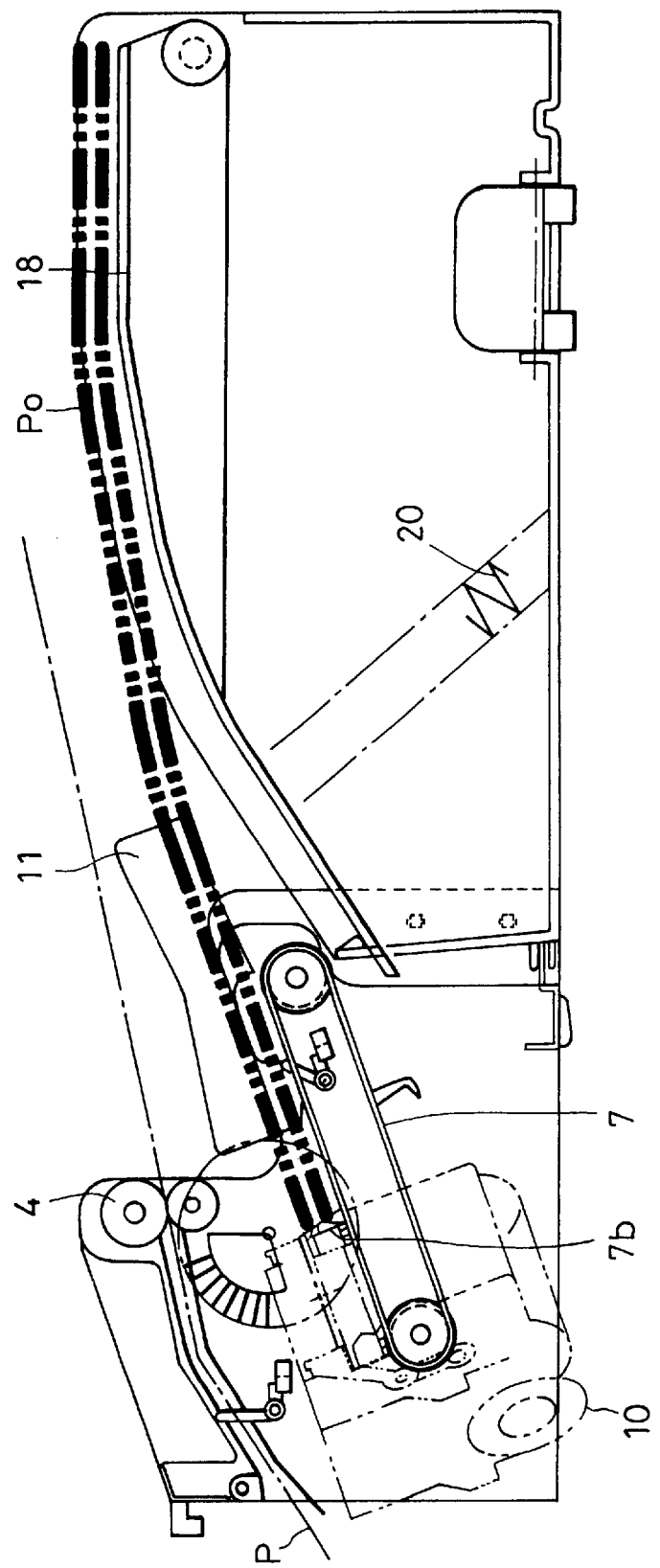
FIG. 8 is a sectional view illustrating the operation of the sheet processor.

FIG. 8 illustrates the case where large sheets, such as A3-size sheets, are loaded onto the processing tray 6. Here, it is assumed that a sheet batch $P_o$ on the processing tray 6 is not subjected to a stapling operation.

Before sheets P discharged by the pair of sheet-discharge rollers 4 reach the aligning mechanism 11, the edge reference members 7b at the first alignment location which allow a stapling operation to be carried out by the stapler unit 10 is moved to the second alignment location situated towards the stack tray 18 and away from the first alignment location by a predetermined distance. At this location, the back edges of the sheets of the sheet batch $P_o$ are aligned. Then, the sheets are aligned in the widthwise direction for loading. Here, the sheet batch $P_o$ is not transported by the edge reference member 7b. This prevents the front edges of the sheets of the sheet batch $P_o$ from protruding from the sheet processor 1.

As can be understood from the foregoing description, in this embodiment, at the top portion of the laser beam printer 101 is provided the sheet processor 1 which, for example, aligns and loads sheets P on which images have been formed by the laser beam printer 101, which performs a stapling operation on the sheets of a sheet batch $P_o$ by the stapler unit 10, and which sorts the sheets of the sheet batch $P_o$ aligned on the stack tray 18. Therefore, the area required to set the entire image forming apparatus can be decreased. In addition, it is not necessary to use a strong frame member for the sheet processor 1, or a linking means for linking the frame member to the body of the image forming apparatus.

In addition, by making it possible to draw out the stack tray 18 on which the sheet batch $P_o$ is loaded, it becomes easier to take out the sheets of the sheet batch $P_o$ stacked on the stack tray 18.

Although, in this embodiment, the scanner 201 and the automatic original transporting unit 301 are provided at the top portion of the sheet processor 1, they can be separated from the laser beam printer 101 in order to dispose the sheet processor 1 at the top portion of the laser beam printer 101. Obviously, similar effects can be obtained when such a structure is used.

A description of another embodiment of the present invention will be given with reference to FIGS. 10 and 11. It differs from the above-described embodiment in that a stack tray is raised and lowered by a motor. The structure of the stack tray and a raising-and-lowering mechanism used in the embodiment will be described.

Figure 10:
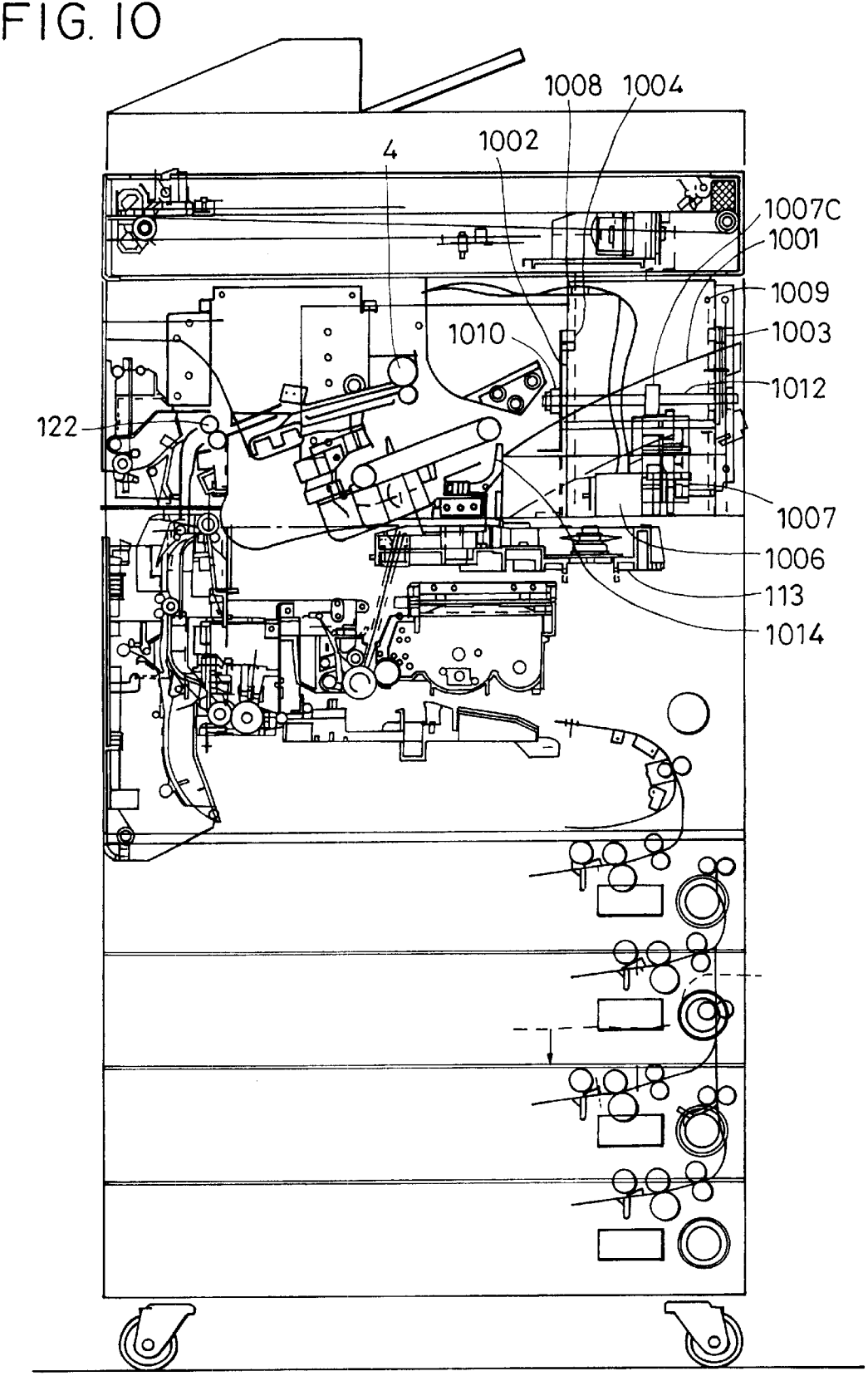
FIG. 10 is an overall view of a post-processing device, a printer, and a reading device used in another embodiment of the present invention.
Figure 11:
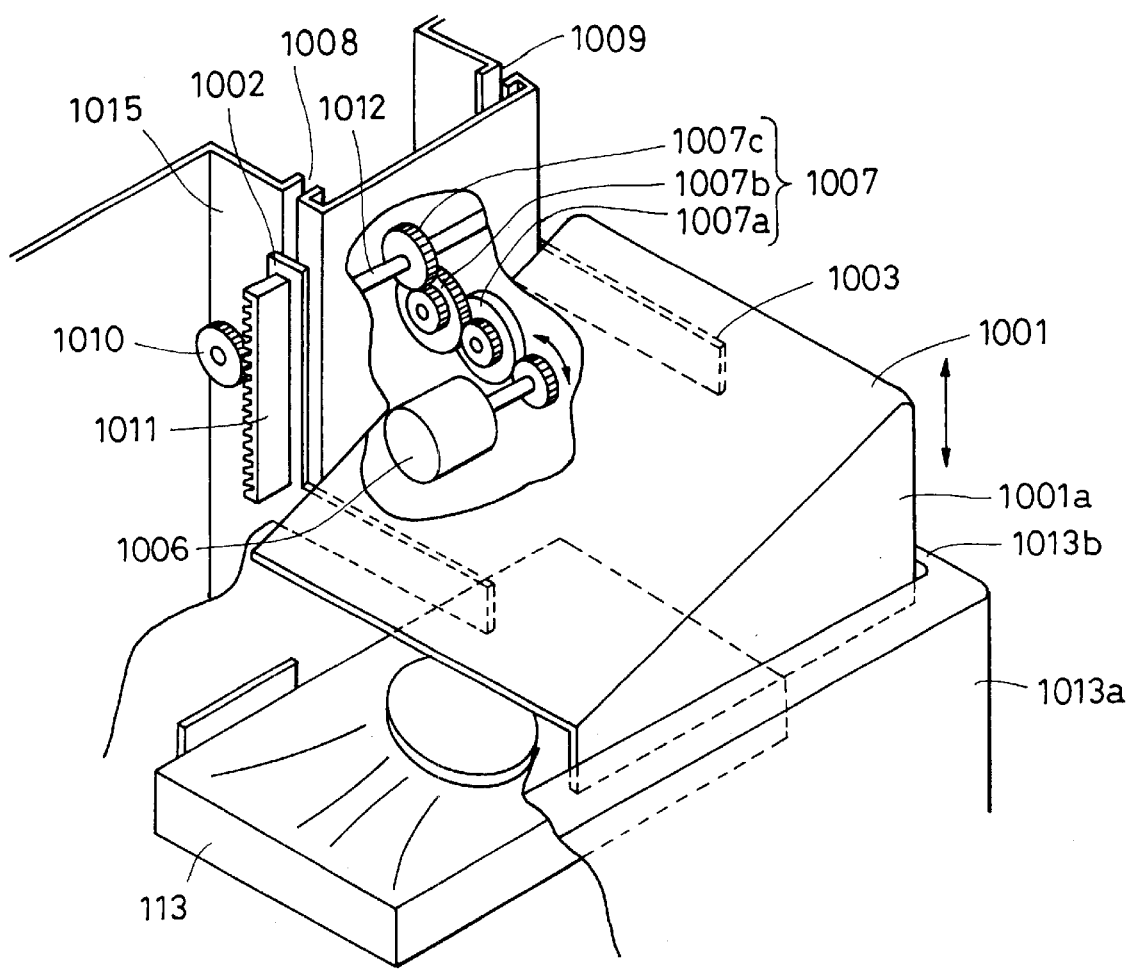
FIG. 11 is a schematic perspective view of the main portion of the devices in FIG. 10.

As shown in FIGS. 10 and 11, a stack tray 1001 is integrally secured to supporting members 1002 and 1003. Racks 1011 are fixedly mounted to both supporting members 1002 and 1003, and roller members 1004 are rotatably supported at a total of four locations, that is, at two locations at the upper side and at two locations at the lower side. The roller members 1004 are guided along rails 1008 and 1009 provided at a frame member 1015 in order to allow vertical movement of the stack tray 1001.

The racks 1011 fixedly mounted to both supporting members 1002 and 1003 are disposed at locations allowing them to engage with respective pinion gears 1010. These two pinion gears 1010 are integrally formed with a shaft 1012, and are rotatably supported by the frame member 1015 through a bush (not shown). A gear 1007c is fixedly mounted to the shaft 1012.

The gear 1007c engages an output gear 1007b of the component parts (that is, a motor 1006, a gear 1007a, and the output gear 1007b) making up a driving unit, so that a driving power from the motor 1006 is transmitted to the pinion gears 1010 through the gear 1007c.

A sheet surface detection sensor 1014 shown in FIG. 10 is a sensor and a detection lever for detecting a topmost sheet of the sheets loaded on the stack tray 1001 at a predetermined height. A simple description of the operation thereof is given below. When a batch of sheets on the stack tray 1001 is discharged, the stack tray 1001 starts to descend. The stack tray 1001 stops descending the moment the sensor 1014 descends to an OFF position. When it is stopped there or when it descends further by a predetermined amount and stops there for a predetermined period of time, it moves upward by a predetermined amount.

By virtue of the above-described structure, when the motor 1006 rotates, the stack tray 1001 rotates vertically in the direction of arrow b, and allows a topmost sheet of the sheets loaded on the stack tray 1001 to be set at a predetermined height.

The basic structure of the raising-and-lowering mechanism of the stack tray has been described. A distinctive feature of this embodiment is that the above-described stack tray raising-and-lowering mechanism is provided at the top portion of the image forming apparatus.

As can be seen in FIGS. 10 and 11, a stack tray drive device is disposed at the lower right back portion in the stack tray. Therefore, space can be saved. In addition, the scanner 113 can be covered using only the stack tray, a front cover 1013a and a right cover 1013b, so that a separate cover does not have to be provided between the stack tray 1001 and the scanner 113 (that is, a polygon mirror).

The supporting members 1002 and 1003 of the stack tray 1001 and the rails 1008 and 1009 are disposed at the back side of the body. Therefore, even if a post-processing device is disposed between the scanner (that is, the image-forming section) and the reading device, sheets can be easily taken out and seen, so that the user can operate the apparatus more easily.

While the present invention has been described with respect to what is presently considered to be the preferred embodiments, it is to be understood that the invention is not limited to the disclosed embodiments. The present invention is intended to cover various modifications and equivalent arrangements included within the spirit and scope of the appended claims.

What is claimed is:

1. A sheet processor to be mounted in a sheet-discharge section of an interior section of an image forming apparatus comprising:

a processing tray for loading thereon sheets transported from the image forming apparatus;

batch transporting means for transporting a batch of the sheets loaded on the processing tray from the processing tray in a batch; and a stack tray for stacking thereon the sheets transported by said batch transporting means;

driving means for raising and lowering the stack tray; and supporting means for supporting the stack tray so that the stack tray can be raised or lowered, said supporting means being provided on a downstream side of the sheet-discharge section, wherein the sheet processor is disposed in the sheet-discharge section.

2. A sheet processor according to claim 1, wherein the sheet discharge section of the image forming apparatus is formed in a top portion of the image forming apparatus.

3. A sheet processor according to claim 1, wherein the sheet processor is detachably mounted to a sheet-discharge tray integrally formed with the sheet-discharge section.

4. A sheet processor according to claim 3, wherein said sheet processor is accommodated in the sheet-discharge section in its entirety.

5. A sheet processor according to claim 1, further comprising widthwise direction aligning means for aligning the sheets loaded on the processing tray in a widthwise direction; and driving means for driving the widthwise direction aligning means, said driving means being used to offset the batch of sheets transported by said batch transporting means.

6. An image forming apparatus comprising:

image forming means for forming an image on a record sheet based on image information;

transporting means for transporting the sheet on which the image has been formed by the image forming means;

a sheet-discharge section for loading the transported sheet thereon in an interior section of the image forming apparatus; and a sheet processor including:

a processing tray for loading thereon the sheets transported by said transporting means from the image forming means;

batch transporting means for transporting a batch of the sheets loaded on the processing tray from the processing tray in a batch;

a stack tray for stacking thereon the batch of sheets transported by the batch transporting means;

driving means for raising and lowering the stack tray; and supporting means for supporting the stack tray so that the stack tray can be raised or lowered, said supporting means being provided on a downstream side of the sheet-discharge section, wherein the sheet processor is disposed in the sheet-discharge section.

7. An image forming apparatus according to claim 6, wherein the sheet processor is detachably mounted above a sheet-discharge tray of the sheet-discharge section of said image forming apparatus.

8. An image forming apparatus according to claim 7, further comprising edge aligning means for aligning edges of the sheets loaded on the processing tray, and processing means for processing the batch of sheets aligned on the processing tray, wherein the processing means is one of a stapler and a puncher.

9. An image forming apparatus according to claim 6, further comprising edge aligning means for aligning edges of the sheets loaded on the processing tray, wherein said edge aligning means aligns the edges of the sheets at a plurality of edge alignment locations; and wherein said batch transporting means comprises a batch transporting belt providing the edge aligning means and for transporting the sheets to the stack tray in a batch as a result of pushing the batch of sheets aligned on the processing tray by the edge aligning means.

10. An image forming apparatus according to claim 7, wherein the stack tray is drawable forwardly of the image forming apparatus, and further comprising guiding means for guiding the stack tray in a direction in which the stack tray is drawn out.

11. A sheet processor according to claim 6, further comprising:

a reading device, disposed above the sheet-discharge section, for reading the image information as a result of scanning of an original; and a sheet binder for binding and loading sheets, said sheet processor detachably mounted within an interior section of said image forming apparatus in a space between the reading device and the sheet-discharge section.

12. A sheet processor to be mounted in a sheet-discharge section in an interior section of an image forming apparatus comprising:

a processing tray for loading sheets transported from the image forming apparatus;

batch transporting means for transporting a batch of the sheets loaded on the processing tray from the processing tray in a batch; and a stack tray for stacking thereon the sheets transported by said batch transporting means;

supporting means for supporting the stack tray so that the stack tray can be raised or lowered, said supporting means being provided on the downstream side of the sheet-discharge section; and driving means for raising the stack tray, wherein the sheet processor is disposed in the sheet-discharge section.

13. A sheet processor according to claim 12, wherein the sheet processor is detachably mounted to a sheet-discharge tray of the sheet-discharge section.

14. A sheet processor according to claim 13, further comprising edge aligning means for aligning edges of the sheets loaded on the processing tray, and processing means for processing the batch of sheets aligned on the processing tray, wherein the processing means is one of a stapler and a puncher.

15. A sheet processor according to claim 12, further comprising edge aligning means for aligning edges of the sheets loaded on the processing tray, wherein said edge aligning means aligns the edges of the sheets at a plurality of edge alignment locations; and wherein said batch transporting means comprises a batch transporting belt providing the edge aligning means and for transporting the sheets to the stack tray in a batch as a result of pushing the batch of sheets aligned on the processing tray by the edge aligning means.

16. A sheet processor according to claim 13, wherein the stack tray is drawable forwardly of the image forming apparatus, and further comprising guiding means for guiding the stack tray in a direction in which the stack tray is drawn out.

17. An image forming apparatus comprising:

image forming means for forming an image on a record sheet based on image information;

transporting means for transporting the sheet on which the image has been formed by the image forming means;

a sheet-discharge section for loading transported sheets thereon in an interior section of the image forming apparatus; and a sheet processor including:

a processing tray for loading thereon the sheets transported from the image forming apparatus;

batch transporting means for transporting a batch of the sheets loaded on the processing tray from the processing tray in a batch;

a stack tray for stacking thereon the sheets transported by said batch transporting means;

supporting means for supporting the stack tray so that the stack tray can be raised or lowered, said supporting means being provided on the downstream side of the sheet-discharge section; and driving means for raising the stack tray, wherein the sheet processor is disposed in the sheet-discharge section.

18. An image forming apparatus according to claim 17, further comprising processing means for processing the batch of sheets aligned on the processing tray, wherein the processing means is one of a stapler and a puncher.

19. An image forming apparatus according to claim 17, further comprising edge aligning means for aligning edges of the sheets loaded on the processing tray, wherein said edge aligning means aligns the edges of the sheets at a plurality of edge alignment locations; and wherein said batch transporting means comprises a batch transporting belt providing the edge aligning means and for transporting the sheets to the stack tray in a batch as a result of pushing the batch of sheets aligned on the processing tray by the edge aligning means.

20. An image forming apparatus according to claim 17, wherein the stack tray is drawable forwardly of the image forming apparatus, and further comprising guiding means for guiding the stack tray in a direction in which the stack tray is drawn out.

21. An image forming apparatus according to claim 17, wherein a stack frame member supports the stack tray, and wherein the stack tray is provided so as to be raisable and lowerable at the stack frame member.

22. An image forming apparatus according to claim 17, further comprising:

a reading device, disposed above the sheet-discharge section, for reading the image information as a result of scanning of an original; and a sheet binder for binding sheets.

* * * * *

UNITED STATES PATENT AND TRADEMARK OFFICE
CERTIFICATE OF CORRECTION

PATENT NO. : 6,671,491 B1  Page 1 of 1
DATED : December 30, 2003
INVENTOR(S) : Yuji Yamanaka et al.

It is certified that error appears in the above-identified patent and that said Letters Patent is hereby corrected as shown below:

Column 2,
Line 39, "be" should be deleted.

Column 3,
Line 23, "be" should be deleted.

Column 12,
Line 21, "A sheet processor" should read -- An image forming apparatus --.

Signed and Sealed this

Twenty-second Day of June, 2004

JON W. DUDAS
*Acting Director of the United States Patent and Trademark Office*